United States Patent

[11] 3,632,451

[72] Inventor Colin E. Abbott
Holyport, near Maidenhead, England
[21] Appl. No. 675,475
[22] Filed Oct. 16, 1967
[45] Patented Jan. 4, 1972
[73] Assignee Mining & Chemical Products Limited
[32] Priority Oct. 17, 1966
[33] Great Britain
[31] 46,228/66

[54] THERMOELECTRIC DEVICE HAVING PARALLEL CIRCUITS INTERCONNECTED AT EQUAL POTENTIAL POINTS
7 Claims, 5 Drawing Figs.

[52] U.S. Cl. .......... 136/203, 62/3, 136/212
[51] Int. Cl. .......... H01v 1/30, H01v 1/32, G21h 1/10
[50] Field of Search .......... 136/200, 201, 202–212, 220, 224–227, 89, 213–216; 62/3

[56] References Cited

UNITED STATES PATENTS

| | | | |
|---|---|---|---|
| 1,081,365 | 12/1913 | Coblentz | 136/213 |
| 1,618,743 | 2/1927 | Adams | 136/225 X |
| 1,934,595 | 11/1933 | Fisher | 136/224 X |
| 2,381,819 | 8/1945 | Graves et al. | 136/225 |
| 2,980,746 | 4/1961 | Claydon | 136/212 X |
| 3,074,242 | 1/1963 | Lindenblad | 136/203 X |
| 3,197,342 | 7/1965 | Neild, Jr. | 136/210 |
| 3,248,889 | 5/1966 | Zimmermann | 136/204 |
| 3,267,727 | 8/1966 | Benzinger | 136/201 X |
| 3,291,648 | 12/1966 | Sheard et al. | 136/212 |
| 3,369,939 | 2/1968 | Myer | 136/89 |

FOREIGN PATENTS

| | | | |
|---|---|---|---|
| 1,163,415 | 2/1964 | Germany | 136/203 |
| 1,165,114 | 3/1964 | Germany | 136/225 |
| 951,982 | 3/1964 | Great Britain | 136/201 |

OTHER REFERENCES

Edser, E. Heat For Advanced Students. 1936. pp. 401–403.
Leighton et al. J. Phys. Chem. vol. 36. 1932. pp 1882–1884.

*Primary Examiner*—Allen B. Curtis
*Assistant Examiner*—A. Bekelman
*Attorney*—Hood, Gust & Irish

ABSTRACT: A thermoelectric device having two or more parallel circuits each comprising a number of thermoelectric couples connected in series and each couple comprising two dissimilar thermoelectric elements connected electrically in series. Preferably the parallel circuits are interconnected at points other than their ends which points would, if not connected, be at equal potential when the device is in use.

INVENTOR:
COLIN EDWARD ABBOTT

By: Hood, Gust and Irish,
Attorneys.

INVENTOR:
COLIN EDWARD ABBOTT
By: Hood, Gust & Irish,
Attorneys.

THERMOELECTRIC DEVICE HAVING PARALLEL CIRCUITS INTERCONNECTED AT EQUAL POTENTIAL POINTS

FIELD OF THE INVENTION

This invention relates to a thermoelectric device of the type comprising an assembly of electrically connected thermocouples each comprising two dissimilar thermoelectric elements for example P-type and an N-type element, which may be employed either in a Peltier effect mode, when the application of a suitable direct electric current gives rise to a heat-pumping effect between the major faces, or in Seebeck effect mode, when the application of a temperature difference between the major faces gives rise to a voltage across the device.

DESCRIPTION OF THE PRIOR ART

A device of this type is known in which the various N-type and P-type elements are connected in series by conductive metallic links or straps. For example such a link can be a strip of metal soldered on to an adjacent P-type and N-type elements, or it can be a strip of metal formed by electrode position on to adjacent P-type and N-type elements.

In service it has been found that the links or the contacts between the links and the elements, are more likely to fail than the elements themselves. Since the connections are in series, if one link or contact fails, the whole device becomes unserviceable.

It is an object of this invention to overcome this disadvantage by providing a device in which failure of a link or an element or a contact renders only part of the device unserviceable.

SUMMARY OF THE INVENTION

According to this invention a thermoelectric device of the type referred to comprises two or more parallel circuits, each circuit comprising a number of thermoelectric couples connected electrically in series, each couple comprising two dissimilar thermoelectric elements connected electrically in series and parallel circuits being adapted for connection electrically at their ends to an external circuit. Interconnections may be made between the circuits of a pair, preferably between points which would, if not connected be at equal potential when the device is in use. The connections between points of equal potential may be metallic links, and links may be common to parallel circuits. Or these connections may be made by providing that some of the thermoelectric elements are common to parallel circuits. To adapt the parallel circuits for connection at their ends to the external circuits either (*i*) the circuits may have a common connecting lead at each end, or (*ii*) each circuit may have a separate lead at each end, the two leads at each end of the device being themselves connected to a single lead of the external circuit.

An embodiment of the invention will now be described with reference to the accompanying drawings in which.

Figure 1:
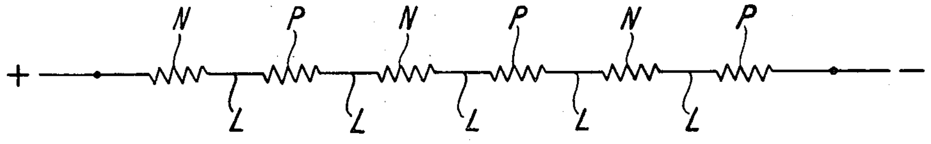
FIGS. 1 to 3 are explanatory, simplified circuit diagrams.

FIG. 1 represents in simplified form a known thermoelectric device having thermoelectric couples each with a P-type semiconductor element P and an N-type semiconductor element N connected by metallic links L. If one link or element should fail, the circuit is broken and the device as a whole is inoperative. (It should be noted that although resistance symbols are used in FIGS. 1, 2 and 3 to represent the thermoelements, this is done for convenience of drawing. In use a thermoelement acts not only as a resistance, but has also associated Seebeck and Thomson voltages).

Figure 2:
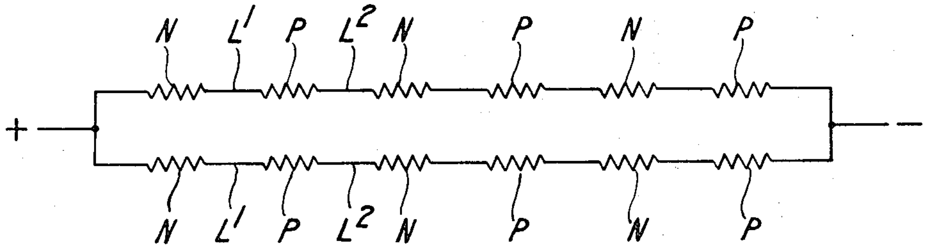

FIG. 2 represents in simplified form one thermoelectric device. It has a pair of circuits connected in parallel and connected at their ends to the same external circuit, as shown. Each circuit has thermoelectric couples and each couple includes in series, a N-type element N, a link $L^1$, a P-type element P, and a link $L^2$. If one link or element should fail, only one circuit is broken and only half the device is inoperative.

Figure 3:
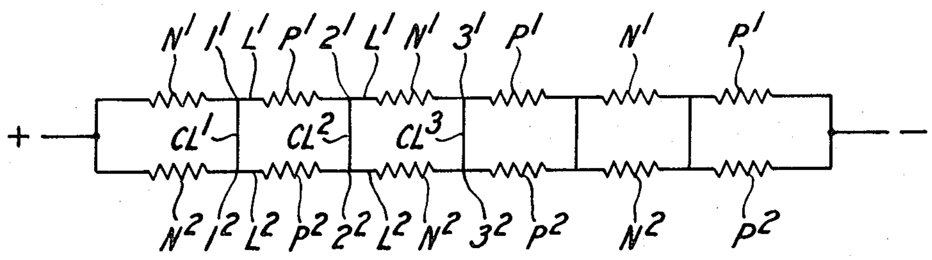

FIG. 3 represents in simplified form a preferred thermoelectric device in accordance with the invention. It is the same as the device of FIG. 2, except that the circuits have a connection $CL^1$ between points $1^1$, $1^2$, a connection $CL^2$ between points $2^1$, $2^2$, and so on. Points $1^1$ and $1^2$ are, in use, at equal potential, as are points $2^1$ and $2^2$ and so on. Although points $1^1$, $2^1$, $1^2$, $2^2$ are shown on the links $L^1$, $L^2$, they could be on the elements $N^1$, $N^2$, $P^1$, $P^2$ and so on, or the connections $CL^1$, $CL^2$ could be constituted by P-type or N-type elements. It will be seen that failure of a link or element does not break either circuit, and the circuit with the failure is supplied through the other circuit. For example, if the first element $P^2$ (reading from the positive end) were to fail, the circuits would then be, reading from the positive end, through the elements $N^1$, $N^2$, through the points $1^1$ and $1^2$ and the connection $CL^1$ to the element $P^1$, and through points $2^1$, $2^2$ and connection $CL^2$ to the remaining elements in both circuits. In this way the reduction in efficiency of the device is relatively small.

Figure 4:
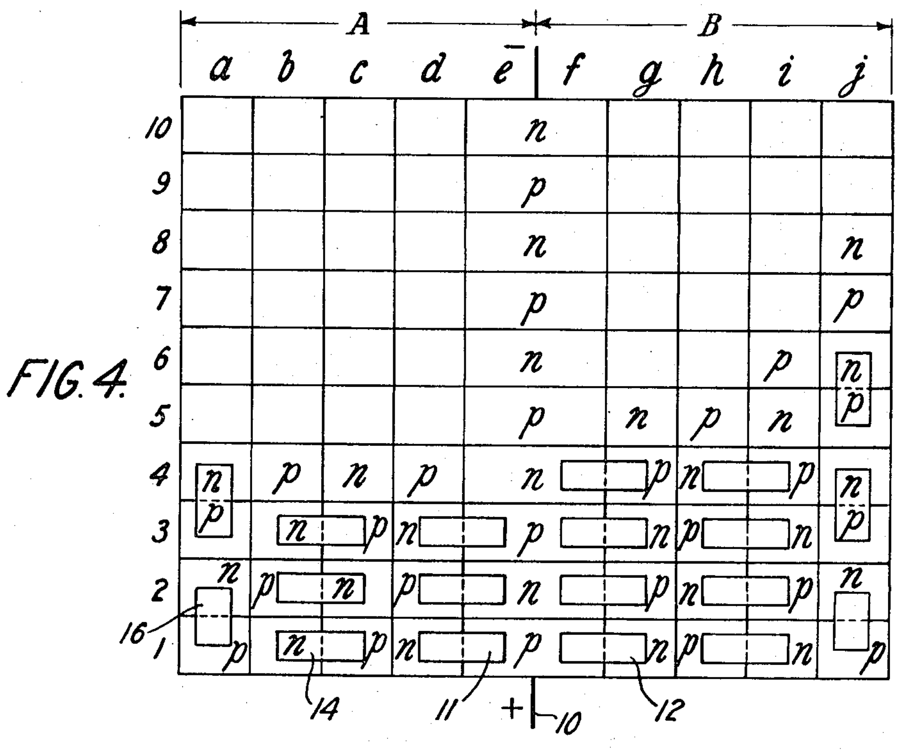
FIG. 4 is a diagrammatic top plan of a thermoelectric device.
Figure 5:
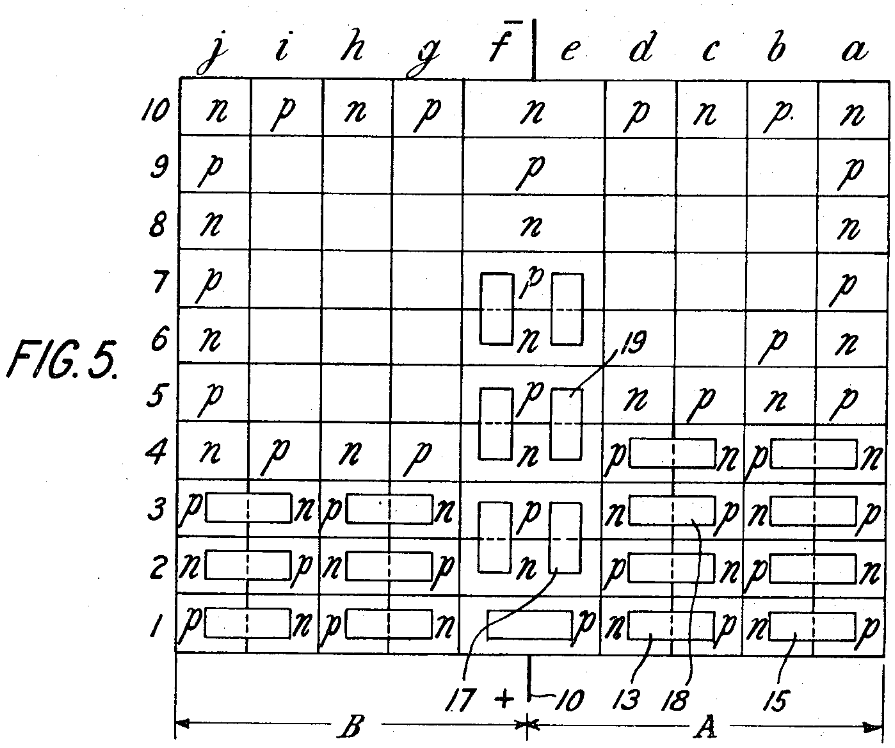
FIG. 5 is a diagrammatic underneath plan of the device of FIG. 4.

FIG. 4 is a diagrammatic top plan and FIG. 5 is a diagrammatic underneath plan of one device in accordance with the invention. For clarity, only some of the connecting links are shown, and also not all the semiconductor elements have been marked "P" and "N".

This device is of modular form, being an assembly of elements bonded together with an intermediate insulating film into a single block or unit. A technique for making such a modular device is disclosed in our British Pat. No. 1,031,566.

The device has 90 semiconductor elements, arranged in vertical rows *a* to *j* and horizontal rows 1 to 10. The elements of vertical rows *a* to *e* are arranged in one circuit group and constitute one circuit A and the elements of vertical rows *f* to *j* are arranged in a second circuit group and constitute the other circuit B. These two circuits constitute a pair of circuits. Each is a series circuit and the pair are connected in parallel at points of equal potential, as will be explained.

The vertical rows *e* and *f* constitute in fact a single vertical row of double-width elements which form the connections between points of equal potential. This can readily be understood by tracing the two circuits.

Commencing from the positive end, and referring to FIG. 4, a positive lead 10 enters the double-width P-type element 1*e*–1*f*. The current passes thence into both circuits, via link 11 to N-type element 1*d* and via link 12 to N-type element 1*g*. Since the arrangement of the two circuits is identical, it will only be necessary to describe one, circuit A. The current passes down through element 1*d*, through link 13 (FIG. 5) on the underside of the device to P-type element 1*c*, up through 1*c*, through link 14 to N-type element 1*b*, down through element 1*b*, and through link 15 to P-type element 1*a*. Now the current passes up through element 1*a* and through link 16 (FIG. 4) to the first element of row 2, viz. N-type element 2*a*. From thence the current passes through the several elements and links of row 2 to double-width N-type element 2*e*–2*f*, then through link 17 (FIG. 5) to P-type element 3*e*–3*f* and then through the several elements and links of row 3 and now 4, to line 19 and through row 5 and so on, back and forth through the remaining rows until N-type element 10*e*–10*f* is reached, the current passing thence to the negative lead.

The positive lead 10 and this negative lead constitute terminal means which connect both circuits A and B in parallel.

A similar current flow applies in circuit B.

It will be seen that each double-width element of vertical rows *e*–*f* is at a common point of the two circuits, which point is a point of equal potential in the two circuits. For example, P-type element 3*e*–3*f* is a connection between the two circuits at row 3, and N-type element 4*e*–4*f* at row 4, and so on.

It will also be seen, as was described with reference to FIG. 3, that if for example a link 18 (FIG. 5) were to fail, then only the elements of rows 3 and 4 in circuit A would be made inoperative. The current normally carried by these elements would then be carried additionally by rows 3 and 4 in circuit B.

Thus, referring to FIGS. 4 and 5, the device comprises a pair of circuits A and B connected in parallel to the positive and negative leads which are connected respectively to elements 1*e*–1*f* and 10*e*–10*f*. Each circuit A and B has a number of thermoelectric couples connected in series and each couple having, in series, a N-type element, say element 1*c* (or an N-type element, a first metallic link, say link 14, an N-type element, say element 1*b*, (or a P-type element), and a second metallic link, say link 15. The circuits A and B are connected to each other at points of equal potential, that is, at elements 1*e*–1*f*, 2*e*–2*f*, 3*e*–3*f*, and so on, to element 10*e*–10*f*.

Other arrangements are possible within the invention. For example the connections between points of equal potential could be formed, not by double-width elements, but by metallic links or straps connecting end elements of adjacent rows of the two circuits. In other words vertical rows *e* and *f* could be of separate elements of the same size as the other elements, and each pair of such separate elements, for example elements 3*e* and 3*f*, would be connected by a metal strap, wire or other conductive connection.

Further, since it has been found that the point of connection of a lead, say lead 10, to a circuit is a point of weakness, it may be desirable to have separate pairs of input and output leads for the pair of circuits. Each pair of such leads would then be connected to a single input or output lead externally of the two circuits.

What I claim is:

1. A thermoelectric device comprising a plurality of thermocouples assembled together, each thermocouple including two dissimilar thermoelectric elements, means connecting each said two elements electrically in series thereby forming a respective one of said thermocouples, said thermocouples being arranged into two circuit groups, there being at least two thermocouples in each group, means connecting the thermocouples in each group electrically in series, terminal means electrically connecting the two series circuit groups of thermocouples in parallel wherein said terminal means comprise common elements of both said series groups, and junction means conductively connecting predetermined thermocouples of the two groups in parallel, wherein said junction means comprise thermoelectric junction elements common to both said series circuit groups, said junction elements being located at equal potential points in the circuits of the two groups when a source of unipotential is connected to said terminal means.

2. The device of claim 1 in which there are more than two thermocouples in each group, said junction means including two conductive connections conductively connecting first and second thermocouples of one group in parallel with first and second thermocouples, respectively, of the other group, said conductive connections being located at equal potential points in the circuits of the two groups.

3. The device of claim 1 in which there are a plurality of thermocouples series connected electrically in each group between said conductive connections.

4. The device of claim 1 in which each thermoelectric junction element includes two similar thermoelectric elements conductively connected together, one of the last-mentioned elements being in each of said two series circuit groups, respectively.

5. The device of claim 1 in which the first-mentioned thermoelectric elements are side by side in rows and columns, each element having dissimilar elements adjacent thereto, each row having one junction element between the ends thereof, the junction elements of adjacent rows being adjacent to each other and dissimilar, each junction element serving as a junction means.

6. The device of claim 5 in which each row has at least two elements on each side of the junction element.

7. The device of claim 6 in which said elements have opposite ends disposed to define first and second surfaces in spaced-apart relation, conductive links secured to said ends in predetermined relation to provide said series electrical connections between said elements and thermocouples, all of said series electrical connections on said first surface being from a first element to a second dissimilar element, and all of said series electrical connections on said second surface being from a second dissimilar element to a first element when traced in the direction of current flow.

* * * * *